UNITED STATES PATENT OFFICE.

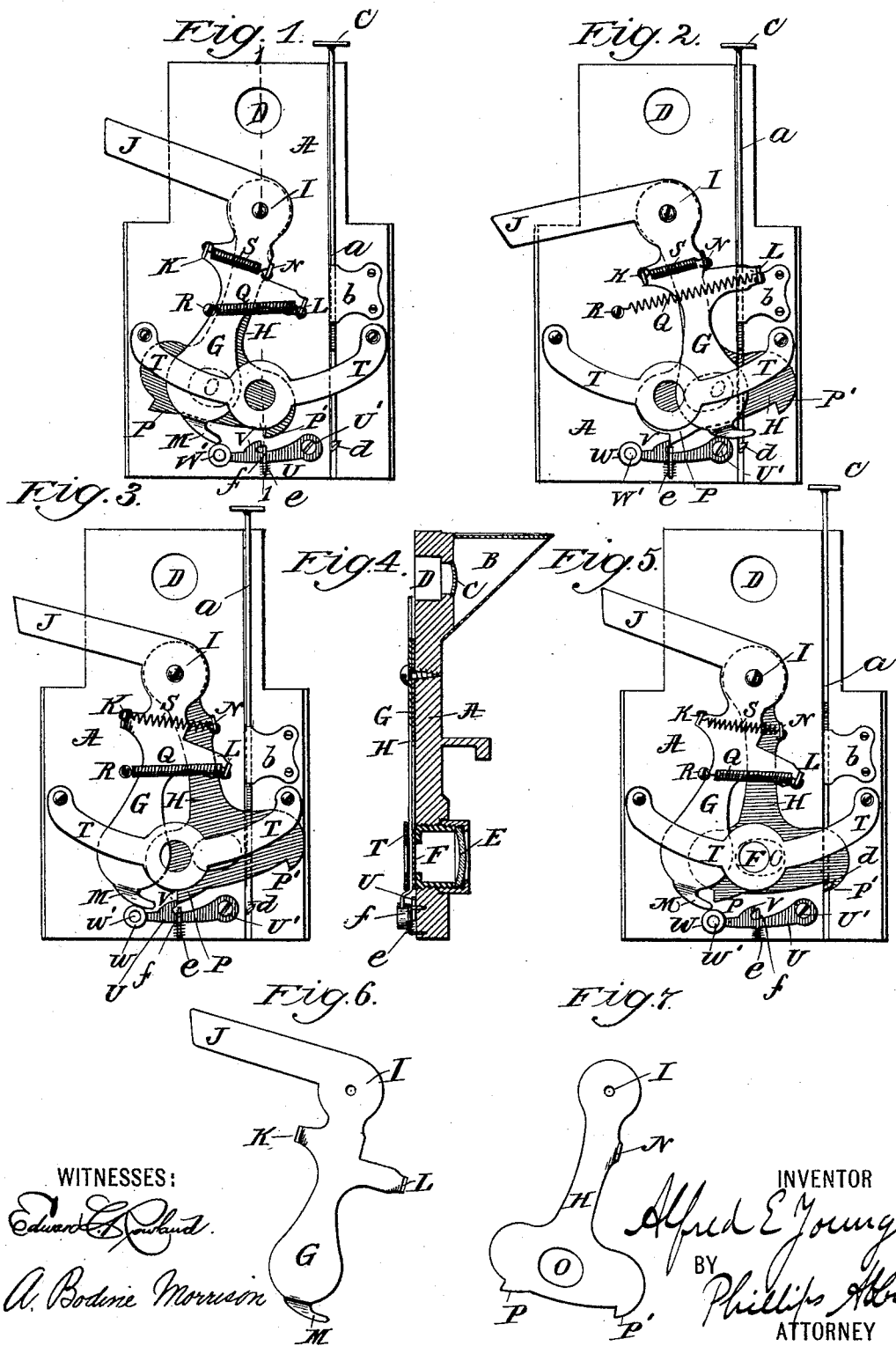

ALFRED E. YOUNGER, OF HUNTINGTON, NEW YORK.

PHOTOGRAPHIC SHUTTER.

SPECIFICATION forming part of Letters Patent No. 573,953, dated December 29, 1896.

Application filed July 14, 1896. Serial No. 599,076. (No model.)

*To all whom it may concern:*

Be it known that I, ALFRED E. YOUNGER, a citizen of the United States, and a resident of Huntington, in the county of Suffolk and State of New York, have invented certain new and useful Improvements in Photographic Shutters, of which the following is a specification.

My invention relates to an improvement in shutters for photographic cameras, the construction and operation of which, owing to the few parts involved, their simplicity and durability, render the shutters peculiarly valuable for all photographic apparatus, and, owing to the compactness of the parts and the fact that they can be made of very small size, yet equally operative with larger parts, makes the shutter especially useful in connection with pocket-cameras or others of small size.

The invention consists in the peculiar construction of the parts, their arrangement, and coöperative operation, as hereinafter described.

In the drawings hereof I have not shown the camera; merely the shutter and its supporting board or plate. It may be attached to a camera in any suitable manner.

Referring to the drawings, Figure 1 illustrates an elevation of the shutter as seen from the front, the parts being in their normal position. Fig. 2 illustrates an elevation, the parts being in the position in which they are under tension ready for an exposure. Fig. 3 illustrates an elevation of the parts in the position in which an exposure is about to be made. Fig. 4 illustrates a vertical section of the parts on the line 1 1 of Fig. 1. Fig. 5 illustrates an elevation of the parts in the position they assume for making a time exposure. Fig. 6 illustrates an elevation of the solid shutter. Fig. 7 illustrates an elevation of the exposure-shutter.

A is a base for the support of the different parts of the shutter. B is a finder provided with the usual lens C and an exposure-opening D. These parts may be made in any desired manner.

E is the lens of the camera proper. F is the exposure-opening. G is the solid shutter. H is the exposure-shutter. These parts, separated from others, are shown, respectively, in Figs. 6 and 7. Both of these shutters are pivoted at I to the base-board. The solid shutter G is made in substantially the shape shown in Fig. 6, and has a laterally-extending thumb-piece or lever J, which projects through the side of the camera, or is otherwise made accessible from the exterior. It is also provided with two forwardly-extending lugs K and L and with a forwardly-extending and curved deflecting-finger M. The exposure-shutter H (see Fig. 7) has a forwardly-extending lug N, an exposure-aperture O, and two detents or catches P P'.

Q is a spring which is fastened at the left-hand end to a pin R, set in the base-board, and at its other end attached to the lug L on the solid shutter G, and S is another lighter spring which is fastened at one end to the lug K on the solid shutter G and at the other end to the lug N on the exposure-shutter H.

T is a guide and guard for the shutters, beneath which they pass from side to side freely and without friction, although they are sustained and held in position by it.

U is a latch pivoted at U' to the base-board and having an upwardly-extending finger V and on its free end a roller W, supported upon a pin W', fastened to or made part of the latch U. Any equivalent for these parts may be employed.

*a* is a vertically-sliding rod which may be set into a groove in the base-board, as shown, and supported therein by a plate *b* or any other suitable device. It preferably has a thumb-piece or handle *c* on its upper end, and is provided with a tooth or catch *d* at or near its lower end.

The latch U is provided with a spring *e*, which normally throws it upward to the limit of its movement, which is determined by a wide staple *f*. (See particularly Fig. 4.)

The operation of the apparatus to make an instantaneous exposure is as follows: After the subject has been properly located and centered on the plate the operator with his thumb depresses the lever J, which projects laterally beyond the camera or is otherwise made accessible, and the lever is depressed as far as it will go, whereupon the parts assume the position shown in Fig. 2; that is to say, the impingement of the lug N on the exposure-shutter H against the side of the solid shutter G carries both shutters to the left, putting the spring Q under tension, as shown in Fig. 2, and during the transit of the parts the finger M on the solid shutter G depresses the latch U, and during the transit the solid shutter G covers the exposure-opening O in the exposure-shutter, so that no light can enter. The operator holds the lever in a depressed position until the exposure is to be made, whereupon he lets go of it, either suddenly or by allowing it to rise, as he prefers, whereupon the parts move into the position shown in Fig. 3—that is to say, the solid shutter G, being actuated by the stronger spring Q, passes to the left, but the exposure-shutter H is held by reason of the engagement of its catch P against the finger V of the latch U, whereby it (the exposure-shutter) is detained, and as the solid shutter moves under the action of the spring Q still farther to the left the lighter spring S is put under greater and greater tension, and as the finger M on the solid shutter passes in contact with the roller W upon the free end of the latch U that latch is depressed until just at the time that the solid shutter has passed to the left out of register with the exposure-aperture in the camera. Then the engagement between the finger V on the latch and the catch P on the exposure-shutter is broken, and thereupon the exposure-shutter H, under the action of the spring S, instantly and rapidly swings to the left and in its transit the exposure is made through its exposure-opening O, which of course registers with the opening F in the base-board. The spring e normally maintains the latch U in an elevated position, whereby it is adapted to perform the functions described.

To make a time exposure, the operation is substantially the same as above described, excepting that the rod a, which has previously been depressed, is now pulled upwardly by its head or thumb piece c, which is accessible from the exterior of the camera, so that the catch or tooth d at or near its lower end is brought upwardly into the path of the catch P' on the exposure-shutter, and when the shutters are moved to the right, as above explained, this catch P' tilts upwardly, as it passes over the tooth d on the rod, and thereafter by reason of the elasticity of the exposure-shutter H drops back again into the same plane as the tooth d. Consequently when the parts are released from their position, as shown in Fig. 3, the exposure-shutter H, under the action of its spring S, moves to the left so far only as to bring its catch P' into contact with the tooth d, whereupon its course is arrested, and in this position the exposure-orifice O in the shutter and the exposure-opening F in the base-board coincide, so that a time exposure of such duration as desired may be had, and at its expiration the rod a is depressed by pressure on its upper end c, whereupon the tooth d is disengaged from the tooth P' and the exposure-shutter then completes its movement to the left and light is excluded.

The simplicity, compactness, and durability of my shutter will be particularly noticed, and it will be obvious to those who are familiar with this art that various modifications may be made in the details of construction of the parts without departing from the essentials of my invention. I, therefore, do not limit myself to such details.

I claim—

1. The combination of a solid shutter provided with a lever and a spring to actuate it, a perforated shutter provided with detents or catches, a spring-actuated latch to engage the apertured shutter, a finger on the solid shutter to release it, a sliding tooth adapted to engage the perforated shutter, and a spring connecting the shutters, put under tension by the movement of the solid shutter, for the purposes set forth.

2. The combination of a solid shutter provided with a lever operated from the exterior of the camera, a spring which actuates said shutter put under tension by movement of the lever, an apertured shutter connected to the solid shutter by a spring, said spring being put under tension by movement of the solid shutter, a catch to retain the exposure-shutter against movement in one direction, and a finger on the solid shutter which actuates said catch, for the purposes set forth.

3. The combination of a solid shutter, an apertured exposure-shutter, both pivoted upon the same center, a lever for actuating said shutters in one direction, springs for actuating them in the opposite direction, a spring-controlled latch, and a sliding latch, both adapted to detain the exposure-shutter against movement in one direction, and a finger on the solid shutter which releases said first-named latch, for the purposes set forth.

Signed at Huntington, in the county of Suffolk and State of New York, this 9th day of July, A. D. 1896.

ALFRED E. YOUNGER.

Witnesses:
DOUGLASS CONKLIN,
JAMES M. BRUSH.